UNITED STATES PATENT OFFICE.

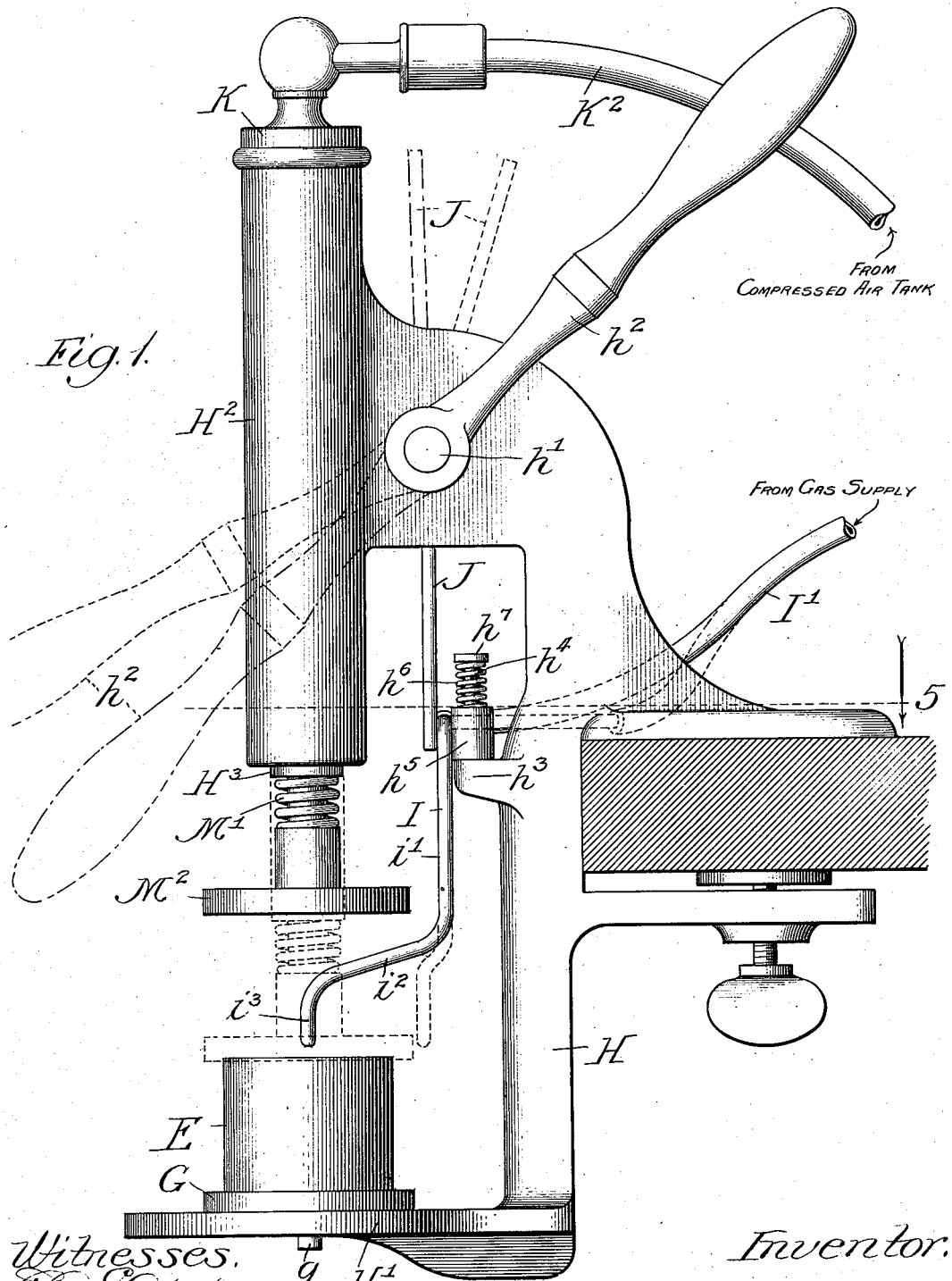

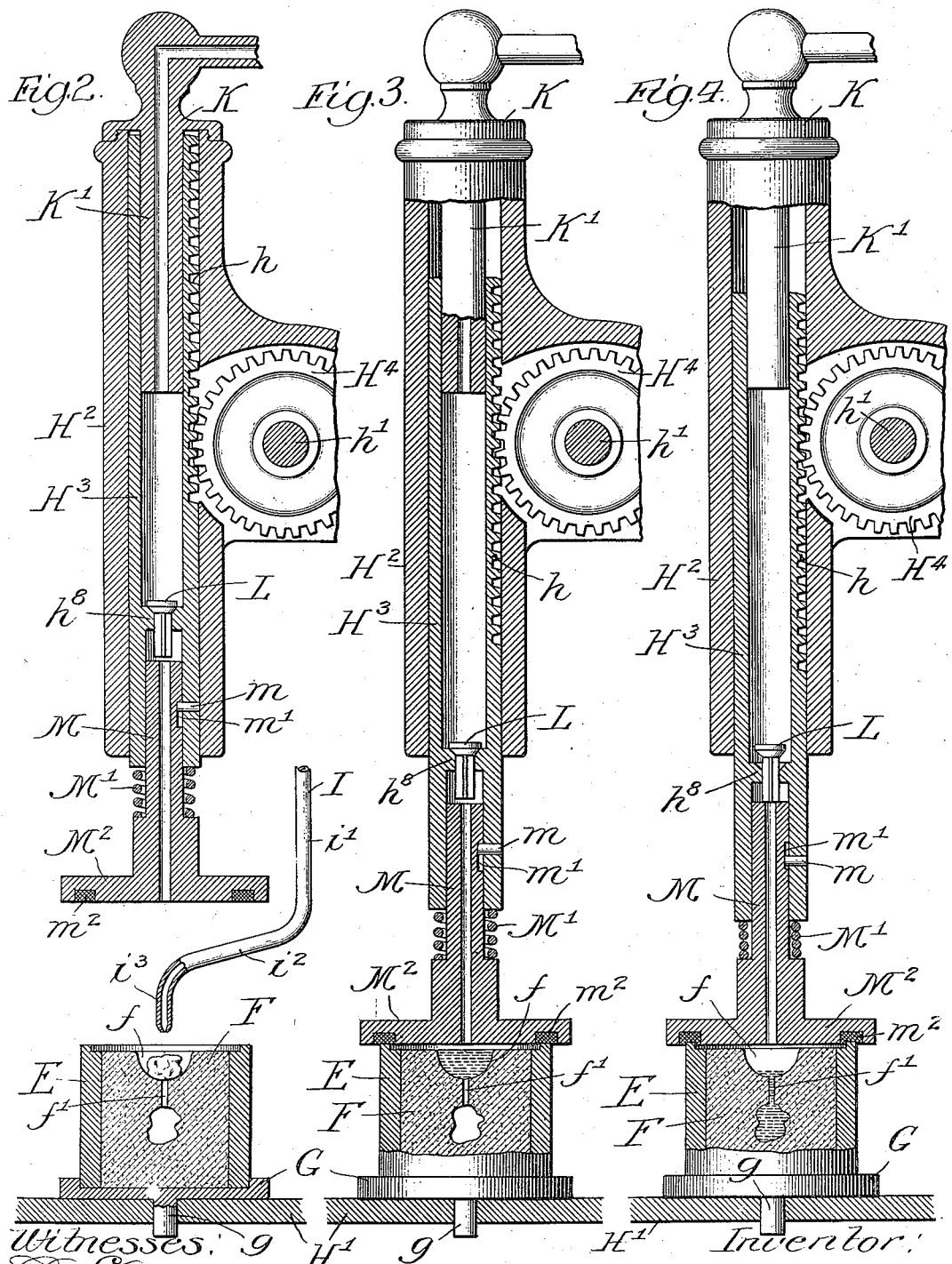

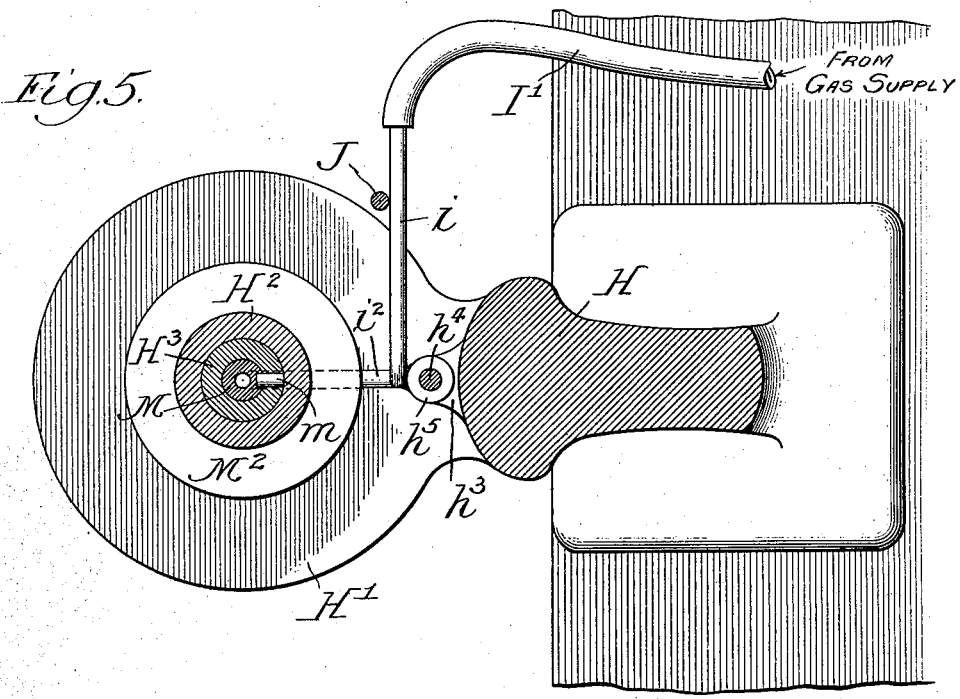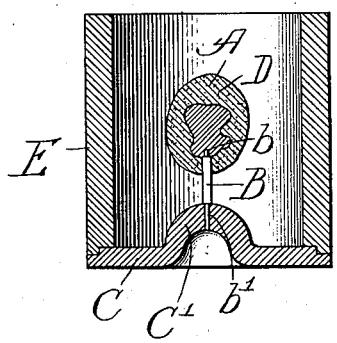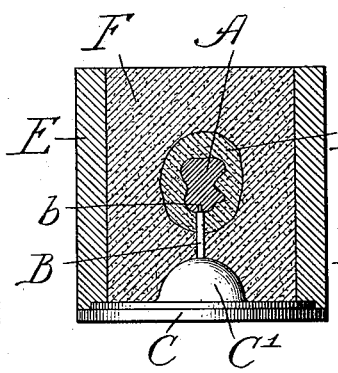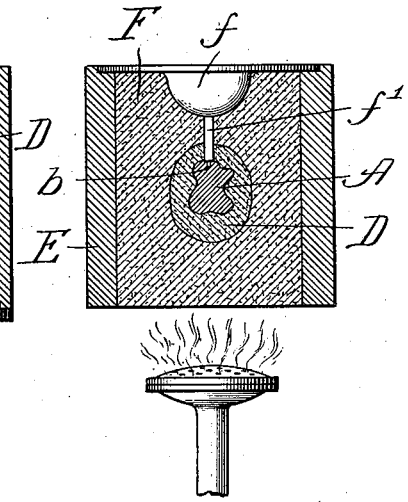

WILLIAM H. TAGGART, OF CHICAGO, ILLINOIS.

APPARATUS FOR MAKING CASTINGS.

983,580. Specification of Letters Patent. Patented Feb. 7, 1911.

Application filed January 12, 1907. Serial No. 351,918.

*To all whom it may concern:*

Be it known that I, WILLIAM H. TAGGART, a citizen of the United States, residing at Chicago, in the county of Cook and State of Illinois, have invented a new and useful Apparatus for Making Castings, of which the following is a specification.

My invention relates to certain new and useful improvements in apparatus for making castings and is fully described and explained in the specification and shown in the accompanying drawing, in which—

Figure 1 is a side elevation of the casting device; Fig. 2 is a central vertical section through the apparatus in its starting position; Fig. 3 is a similar section showing the device just after the seal has been made and before pressure is applied; Fig. 4 is a similar section showing the parts after a further movement, when pressure is applied; Fig. 5 is a transverse section in the line 5—5 of Fig. 1; Fig. 6 is a transverse section through the flask after the pattern has been formed and the first coating of material has been placed upon it; Fig. 7 is a similar section showing a further step in the formation of the mold; and Fig. 8 is a similar section showing the final step in the formation of the mold.

My invention is designed for casting dental fillings of the type known as inlay fillings. Certain features of my invention can doubtless be used in other connections, but as to other features my invention has no utility outside of the dental art, and that portion of the dental art very closely allied to the manufacture of inlay fillings, as, for instance, the making of bridgework, crowns and the like. With the use of my apparatus and by the steps of procedure herein set forth, it is possible to produce dental fillings of the type in question, very simply, easily and quickly.

As the first step in the use of my device and in practicing the method which I have devised, I form a pattern, A, (Figs. 6, 7, and 8). This pattern is formed of a fine grade of wax, substantially freed from solid impurities, preferably by melting and filtering. In making dental inlays this wax is made of such consistency as to be readily moldable at the temperature of the body, and the pattern is made by placing the wax directly in the cavity to be filled so as to get the contour of the cavity, forming the top surface of the pattern by bringing the jaws of the patient together so as to get the proper top contour for the pattern, and trimming off any excess of material. Thus by a very simple and substantially painless operation an exact wax pattern of the desired filling can be produced with but little inconvenience to the patient, the pattern having perfect articulation with the teeth to which the filling is to be opposed.

Having formed the pattern, I thrust into it one end, $b$, of a sprue former, B. It will be noted that this sprue former is cylindrical in form, having at one end a small point, $b$, for insertion into the pattern and having at the other end a reduced portion, $b^1$, which is adapted to fit into a hole in a flask cover, C. After securing the pattern to the sprue former, I spread around it a primary body, D, of plastic material, such as dental investment material, using the greatest care to bring the plastic material into intimate contact with the pattern, so that no air bubbles are formed. During this operation the sprue former makes a convenient handle by which the pattern can be supported. After forming the body, D, I insert the reduced end, $b^1$, of the sprue former, B, into the central opening in the flask cover, C, as shown in Fig. 6. It is to be noted that this cover has a curved central portion, $C^1$, which projects from the main plane of the cover toward the pattern. After having secured the sprue former to the cover of the flask, I place a flask, E, in position as shown in Fig. 6, the cover and flask being shouldered to insure a correct relative position between the two. I then pour into the flask while still in the inverted position shown in Fig. 6, a secondary body, F, of plastic material, as, for instance, dental investment material, until the flask is filled full and level to the bottom. I find that in pouring in material in this way air bubbles are likely to be formed between it and the surface against which it is poured, and it is for this reason that I make the first or primary coating directly upon the pattern by hand and with great care, for when such a body is formed and the secondary body of plastic material is poured in, any air bubbles which are formed by the pouring will be outside the primary coat of plastic material instead of along the surface of the pattern.

After the secondary body of plastic material is poured in, I permit the flask and mold to stand until the plastic material has set, after which I remove the cover, C, so as to expose the top surface of the mold and to leave a small, crucible-shaped depression, $f$, in its upper surface. I also draw out the sprue former so as to leave the sprue, $f^1$, in the mold. I then place the flask and contained mold and pattern over a suitable burner, (Fig. 8), and heat the same so as to melt the pattern. A portion of the wax of the pattern flows into the pores of the plastic material used for the mold, and the remainder thereof is, by continued heating, completely vaporized and passes out of the sprue, thus leaving a complete and perfect mold properly gated for the entrance of metal and without any parting line. It will be understood that this feature is of great advantage in making small castings such as dental castings, in which the making of a parting line would necessarily introduce so large an imperfection into the mold as to make the casting useless for a filling, and that it also makes it possible to cast objects which could not be drawn from a mold.

After the pattern is completely dissipated, I place the flask in a centering plate, G, hollowed to receive it and I insert a central pin, $g$, in said centering plate in a perforation in the bracket, $H^1$, on the frame, H, of the casting machine. The frame, H, is provided with clamps by which the device can be secured to a bench or the like, and the said frame carries a vertical barrel above the position of the centering plate. Within this barrel, $H^2$, is a hollow, vertically-movable plunger, $H^3$, provided with a series, $h$, of teeth, meshing with a pinion, $H^4$, carried by a shaft, $h^1$, which is adapted to be rotated in a direction to force said hollow plunger downward by means of a handle, $h^2$. When this handle is swung from the position shown in solid line in Fig. 1 to the lowest position shown in dotted lines in the same figure, the plunger, $H^3$, will move from the position shown in Fig. 2 to the position shown in Fig. 4.

The frame, H, of the casting device, carries a small bracket, $h^3$, which supports a vertically-extending pin or stud, $h^4$, upon which is rotatably mounted a collar, $h^5$, a spring, $h^6$, being provided between said collar and a head, $h^7$, on the upper end of the pin or stud, $h^4$, to exert a frictional resistance to rotation of the collar, so as to permit said collar to be rotated and yet to hold the same in any position in which it may happen to be. The collar, $h^5$, carries a burner tube, I, said burner tube comprising a horizontal portion, $i$, at substantially the level of the collar, a vertical portion, $i^1$, extending downward from the collar, a forwardly-extending portion, $i^2$, whose plane is at right angles to the plane of the horizontal portion, $i$, and a downwardly-extending nozzle, $i^3$. The burner tube is supplied by means of a flexible tube, $I^1$, with combustible vapor, preferably a mixture of city gas and laughing gas, which gives a very intense heat. The shaft, $h^1$, bears on the opposite end from the handle, $h^2$, a rod, J, which, when the handle, $h^2$, is in the position shown in the solid lines in Fig. 1, extends downward and contacts with the horizontal portion, $i$, of the burner tube as illustrated in Fig. 5. As the handle, $h^2$, is rotated to bring the plunger, $H^3$, downward, the first result of its rotation is to swing said bar, J, backward, and cause the rotation of the collar, $h^5$, and the burner tube, so as to swing the nozzle, $i^3$, of said burner tube from a position immediately over the hollow, $f$, in the top of the mold, to the position shown in dotted lines in Fig. 1, where the flame issuing from the nozzle is removed to a considerable distance from the mold.

A plug, K, closes the top of the barrel, $H^2$, and has a hollow, downwardly-projecting boss, $K^1$, which makes a tight fit with the inside of the plunger, $H^3$, and the hollow of the boss, $K^1$, is connected with a compressed air supply by a tube, $K^2$. The upper portion of the plunger, $H^3$, is cut off from the lower portion thereof by means of a horizontal diaphragm, $h^8$, centrally perforated and provided with a valve seat, in which is seated a valve, L, having a conical head and stem with a series of ribs running in the perforation of the diaphragm. Thus when the valve is closed, the compressed air cannot pass through the diaphragm and when the valve is open the air passes through along the spaces between the ribs of the valve stem.

In the lower portion of the plunger, $H^3$, is a relatively movable, centrally-perforated rod, M, the movement of which with respect to the plunger is limited by means of a pin, $m$, on the plunger, said pin running in a slot, $m^1$, in the rod, M, the rod, M, being normally held in its lowermost position by means of a spring, $M^1$. To the lower end of the rod, M, is secured a sealing head, $M^2$, in the lower face of which is an annular packing ring, $m^2$, preferably of asbestos or some similar heat-resisting material, the packing ring being so positioned and of such size as to contact with and fit tightly the upper edge of the flask, E, when in position to be operated upon.

The operation of my improved device, after the mold has been formed and the pattern dissipated, is substantially as follows:— After positioning the mold, I place in the crucible-shaped hollow thereof a mass of metal of suitable size to form the desired casting and leave a slight excess. I then turn on the gas supply and adjust the flame to the proper point, after which I swing the burner tube manually to the position shown in the solid line shown in Fig. 1 and Fig. 3, permitting the intense heat of the flame to act upon the metal in the hollow of the mold until it is completely melted. None of the metal, however, will flow down through the sprue, owing to the small size of the sprue and the surface tension of the molten metal. After the metal has been sufficiently heated, I swing the handle, $h^2$, forward from the position shown in solid lines in Fig. 1. The first result of this movement is to swing the burner tube out of position, so that the heat is removed from the molten metal and the burner tube swung out of the way of the downwardly-descending sealing head. As the handle is still farther swung forward, the sealing head makes contact with the flask, establishing a hermetic seal between the central bore of the rod, M, and the mold. A further downward swing of the handle compresses the spring, $M^1$, and produces a high degree of pressure between the flask and the packing ring in the sealing head, and as a final result of the continued swing of the handle, the valve, L, strikes the upper end of the rod, M, opening communication between the compressed air supply and the sealing head, whereupon air pressure, usually of about 25 pounds indicated pressure is applied to the molten metal, forcing it down through the sprue and to all the interstices of the mold. Of course it will be understood that the swing of the handle takes place as one continuous rapid movement, and that within a fraction of a second from the time the flame is removed from the molten metal, the compressed air is applied to it and it is forced into the mold.

I find that this apparatus gives castings which reproduce with the greatest fidelity every line and angle of the pattern, and that the finest grade of work can be done without difficulty. Furthermore, when the pattern is made in direct contact with the object to which the casting is to be fitted, as in the case of a dental inlay, I find that the resulting casting fits the object to which it is to be applied with absolute accuracy, the fit being as accurate as can ordinarily be made in the manufacture of cylindrical parts by machinery. The apparatus also produces castings of this character of such small size as to make casting in the ordinary way a practical impossibility, because in the case of very small castings the heat contained in the small body of metal used is not sufficient to maintain it in a fluid condition until it can reach all the interstices of the mold. With my apparatus and method the fluid metal is forced with great rapidity into the mold, so that it loses comparatively little heat, and furthermore the pressure upon it forces it forward and holds it in intimate contact with the surface of the mold even after it has begun to stiffen to a slight extent.

I am aware of the construction shown in the patent to Hollingsworth #708,811, patented September 9, 1902, which shows and describes a machine in which the metal when melted in the crucible is poured into a chamber and from the chamber is forced into the mold cavity. I desire to have it understood that the claims covering my invention do not cover such a construction.

The method of making castings which I have above outlined in connection with my apparatus, is set forth, described and claimed in an application which I have filed on even date herewith and which is allotted Serial No. 351,917, and therefore by failure to claim that method in this case, I do not intend to disclaim the same in any way. That portion of the apparatus herein described which is used in making the mold, and that portion of the method which consists in the method for making the mold, form the subject matter of two other divisional applications filed on the 12th day of July A. D. 1907, and allotted Serial Numbers 388,481 and 388,482 respectively. I have endeavored in this case to claim more particularly the casting apparatus including the mold itself as a portion of said apparatus, the other portions of the apparatus and method being fully claimed in the other applications filed.

It will be obvious that great variation can be made in the construction of the apparatus herein set forth, and except as pointed out in the claims which follow, I do not intend to limit myself to the form thus particularly shown and described.

I claim—

1. The combination, with a base and a flask support thereon, of a standard overhanging said support, a plunger vertically movable in said standard, a disk carried by said plunger and adapted to engage the top of a flask resting on said support, a fluid pressure nozzle carried by said plunger and connected with a source of fluid pressure supply and having a controlling valve, mechanism for depressing said plunger and means for opening said valve at a predetermined point in the descent of said plunger and disk.

2. The combination with a mold having a depression adapted to act as a crucible for melting the metal to form the casting, of a burner adapted to direct a flame against the metal in said depression, means for applying gas pressure to the body of metal melted in said depression, and means for removing the flame from the metal immediately before the pressure is applied thereto.

3. The combination with a mold having a depression adapted to serve as a crucible for melting the metal which is to form the casting, of a burner situated above the mold and adapted to direct a flame downward into said depression, means for applying gas pressure to the body of metal melted in said depression, and means for removing the flame from the metal immediately before pressure is applied thereto.

4. The combination with a mold having a depression adapted to serve as a crucible for melting the metal which is eventually to form the casting, of a burner above the mold and adapted to direct a flame downward into said depression, a sealing head, means for supplying compressed gas to the sealing head, means for lowering the sealing head and means for moving the burner from the path of the sealing head before the sealing head reaches the position thereof.

5. The combination with a mold having a depression adapted to serve as a crucible for melting the metal to form the casting, and a burner above the mold adapted to direct a flame downward into said depression, of a sealing head, means for supplying compressed gas to the sealing head, a plunger carrying the sealing head, a hand lever for lowering the plunger, and a rod movable with the hand lever and arranged to move the burner from the path of the sealing head as the sealing head begins its descent.

6. The combination with a flask and a mold therein, of a sealing head, a packing ring in the sealing head arranged to contact with the upper edge of the flask, means for supplying compressed gas to the sealing head, means for lowering the sealing head, and means for turning on the compressed gas to the sealing head after a seal has been effected.

7. The combination with a flask and a mold therein, having a depression adapted to serve as a crucible for melting the metal to form the casting, and a burner above the mold adapted to direct a flame downward into said depression, of a sealing head, a packing ring in the sealing head arranged to contact with the upper edge of the flask, means for supplying compressed gas to the sealing head, means for lowering the sealing head, means for turning on the compressed gas to the sealing head after a seal has been effected, and means for swinging the burner from the path of the sealing head, as the sealing head begins its descent.

8. In a device of the class described, the combination with a mold of a hollow plunger, means for lowering the plunger, means for supplying compressed gas to the plunger, a hollow rod having a limited movement in the plunger, a spring holding said rod normally downward with respect to the plunger, a diaphragm in the plunger, a valve controlling the diaphragm and arranged to be opened by the movement of the rod upward with respect to the plunger, and a sealing head carried by and having connection with the rod and arranged to seal the mold and transmit pressure to the metal therein.

9. The combination with a mold having a depression adapted to serve as a crucible for melting the metal to form the casting, and a burner above the mold and adapted to direct a flame downward into the depression therein, of a hollow plunger, means for lowering the plunger, means for supplying compressed gas to the plunger, a hollow rod having a limited movement in the plunger, a spring holding said rod normally downward with respect to the plunger, a diaphragm in the plunger, a valve controlling the diaphragm and adapted to be opened by the movement of the rod upward with respect to the plunger, a sealing head having connection with the rod and arranged to coöperate with the mold to seal the same and apply pressure to the metal therein, and means for moving said burner to swing the flame away from the metal in the depression of said mold before the sealing head reaches the mold.

10. In a device of the class described, the combination with a mold, of a plunger and means for lowering the same, a rod having a limited movement with reference to the plunger, means for holding said rod normally downward with respect to the plunger, a sealing head carried by the rod, a compressed gas supply, and means operated by relative movement of the rod and plunger for opening communication between the sealing head and the compressed gas supply.

11. In a device of the class described, the combination with a mold having a depression adapted to serve as a crucible for melting the metal to form the casting, a sealing head, a compressed gas supply, a burner adapted to direct a flame against the metal in the depression of said mold, a lever having connection with the sealing head for lowering the same, and means operated by the initial movement of the lever, for swinging said burner out of the path of the sealing head and the flame off the metal in said depression, and means operated by the final movement of the lever after a seal is effected, for connecting the sealing head with the compressed gas supply.

12. The combination with a mold having a depression in its upper surface adapted to serve as a crucible for melting the metal to form the casting, of means for supplying heat to the metal within said depression, a sealing head, a source of compressed gas supply, a hand lever and means operated by continuous movement of the handle in one direction for first cutting off the heat from the metal within the depression of the mold, then establishing a seal between the sealing head and the mold, and subsequently opening communication between the source of compressed gas supply and the sealing head, whereby the molten metal is forced under pressure into the interstices of the mold.

13. In a device for casting dental inlays and the like, material having surfaces formed to provide a mold cavity, material having surfaces formed to provide a crucible cavity, said mold cavity and crucible cavity being directly connected by a sprue-hole, said parts being so constructed and related that molten metal may be forced directly from the crucible cavity into the mold cavity by a single action, the size of the sprue hole being such as to prevent the molten metal flowing therethrough until the force is applied.

14. In a device for casting dental inlays and the like, a mold having a hollow to receive the metal to be cast, a depression forming a crucible, and a sprue-hole directly connecting the depression with the hollow, said parts being so constructed and related that molten metal may be forced directly from the crucible to the hollow by a single action, the size of the sprue hole being such as to prevent the molten metal flowing therethrough until the force is applied.

15. In a device for casting dental inlays and the like, a one piece mold having a hollow to receive the metal to be cast, a depression in the exterior surface of the mold which forms a crucible, and a sprue-hole directly connecting the depression to the hollow, said parts being so constructed and related that molten metal may be forced directly from the crucible into the hollow by a single action, the size of the sprue hole being such as to prevent the molten metal flowing therethrough until the force is applied.

16. In a device of the class described, a flask, a mold therein having in its upper surface a depression to serve as a crucible for melting the metal, a hollow to receive the metal, and a sprue-hole connecting the depression with the hollow, in combination with a sealing-head having connection with a source of fluid under pressure, the sealing-head being arranged to contact with the edge of the flask to make a tight connection.

17. In a device of the class described, the combination with a mold having a depression adapted to serve as a crucible for melting the metal to form the casting, of a burner adapted to direct a flame to the metal within said depression and means for producing a variation between the pressure upon the metal in the depression and the interior of the mold whereby the metal can be caused to enter the mold.

18. In a device of the class described, the combination with a mold having a depression adapted to serve as a crucible for melting the metal to form the casting, of a burner adapted to direct a flame to the metal within said depression, and means for applying pressure to the body of metal melted in said depression.

19. The combination with a flask, of a mold within the flask having a depression in its upper surface to serve as a crucible for the melting of the metal to form the casting, a sealing-head adapted to engage the edge of the flask to effect a seal, and means for supplying compressed gas to the sealing-head.

20. The combination with a flask, of a mold within the flask having a depression in its upper surface to serve as a crucible for the melting of the metal to form the casting, a sealing-head adapted to engage the edge of the flask to effect a seal, and means for supplying compressed gas to the sealing-head after the seal has been effected.

WILLIAM H. TAGGART.

In presence of—
J. H. LANDES,
C. W. WASHBURNE.